No. 673,988. Patented May 14, 1901.
L. O. LINVILLE.
LENS CUTTING MACHINE.
(Application filed Nov. 8, 1900.)
(No Model.) 2 Sheets—Sheet 1.

WITNESSES:
S. P. Williams
A. L. Phelps

INVENTOR
Lewis O. Linville
BY
H. B. Bradshaw
ATTORNEY

No. 673,988. Patented May 14, 1901.
L. O. LINVILLE.
LENS CUTTING MACHINE.
(Application filed Nov. 8, 1900.)
(No Model.) 2 Sheets—Sheet 2.
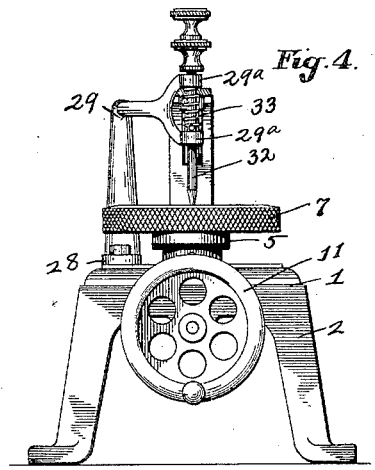
Fig. 4.
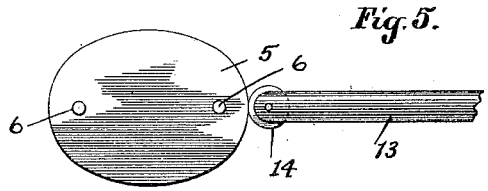
Fig. 5.
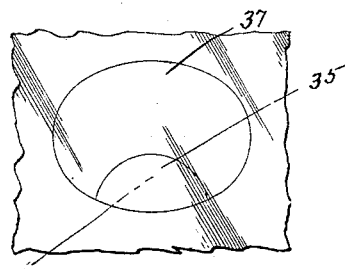
Fig. 10.
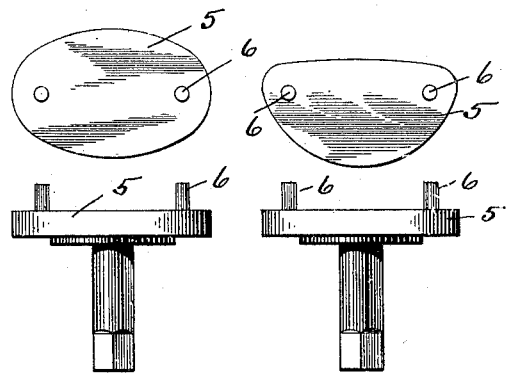
Fig. 6. Fig. 7.
Fig. 8. Fig. 9.
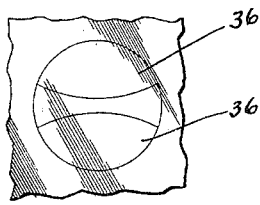
Fig. 11.
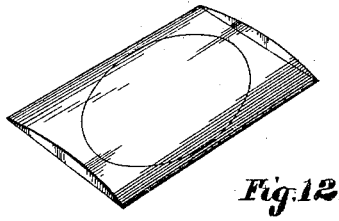
Fig. 12.
Fig. 13.
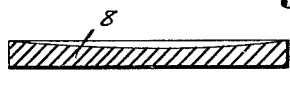
Fig. 14.
WITNESSES:
S. P. Williams
A. L. Phelps
INVENTOR
Lewis O. Linville
BY H. B. Bradshaw
ATTORNEY
THE NORRIS PETERS CO., PHOTO-LITHO., WASHINGTON, D. C.

UNITED STATES PATENT OFFICE.

LEWIS O. LINVILLE, OF COLUMBUS, OHIO, ASSIGNOR TO THE COLUMBUS PHARMACAL COMPANY, OF SAME PLACE.

LENS-CUTTING MACHINE.

SPECIFICATION forming part of Letters Patent No. 673,988, dated May 14, 1901.

Application filed November 8, 1900. Serial No. 35,810. (No model.)

*To all whom it may concern:*

Be it known that I, LEWIS O. LINVILLE, a citizen of the United States, residing at Columbus, in the county of Franklin and State of Ohio, have invented a certain new and useful Improvement in Lens-Cutting Machines, of which the following is a specification.

My invention relates to the improvement of lens-cutting machines; and the objects of my invention are to provide an improved machine of this class of superior construction and arrangement of parts; to provide said machine with improved means of adjustment whereby lenses may be accurately cut to desired outlines or sizes; to provide improved means for supporting and adjusting the cutting-diamond; to provide certain parts of my improved machine with such graduations as will facilitate the setting of the parts governing the shapes and sizes of lenses desired, and to produce other improvements the details of construction and arrangement of parts of which will be more fully pointed out hereinafter. These objects I accomplish in the manner illustrated in the accompanying drawings, in which—

Figure 1:
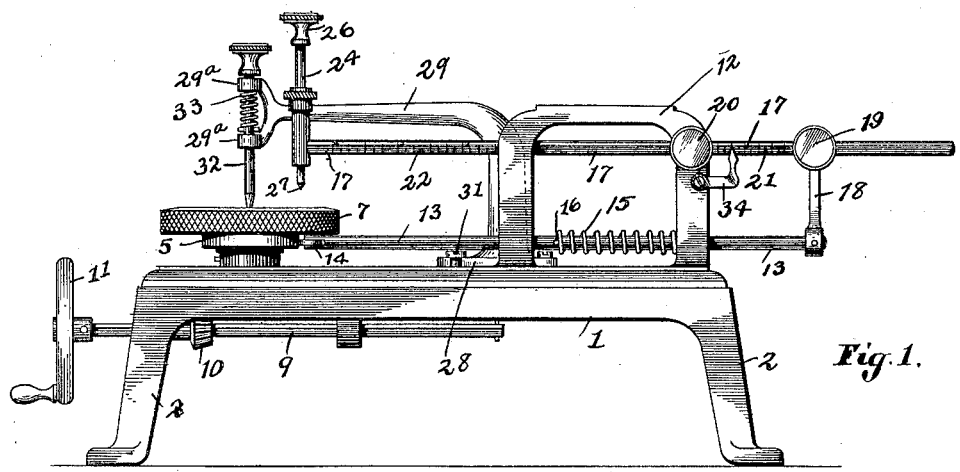
Figure 2:
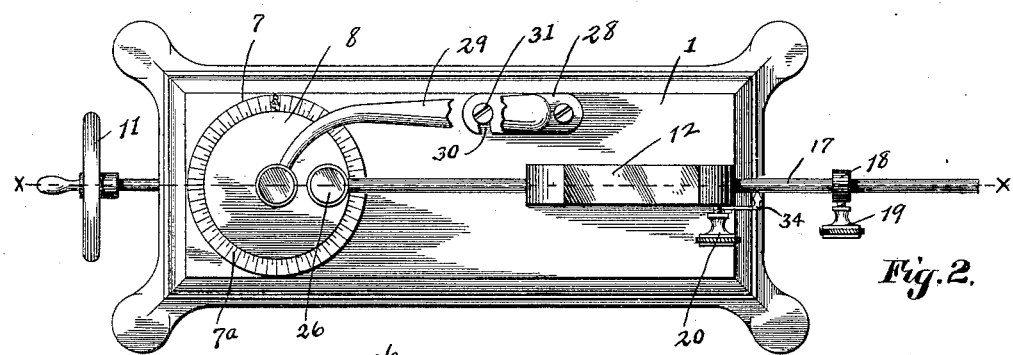
Figure 3:
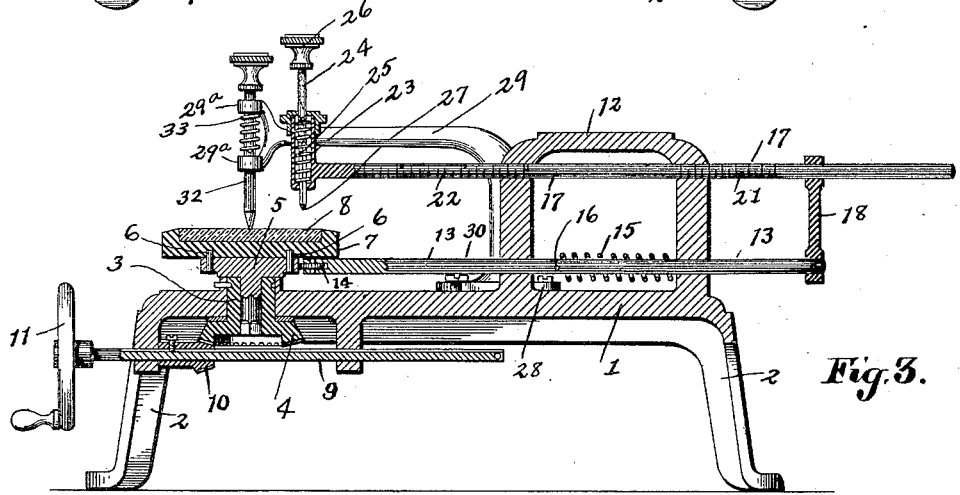

Figure 1 is a side elevation of my improved machine. Fig. 2 is a plan view of the same. Fig. 3 is a central longitudinal section on line $x\ x$ of Fig. 2. Fig. 4 is an end view. Fig. 5 is a detail plan view of one of the pattern-cams shown in conjunction with a portion of one of the cutter-operating rods. Fig. 6 is a similar view of a modified form of a lens pattern-cam. Fig. 7 is a similar view of another modification. Fig. 8 is a side elevation of the pattern-cam and its stem shown in Fig. 6. Fig. 9 is a similar view of the cam shown in Fig. 7. Fig. 10 is a face view of an uncut lens, showing the lines marking a bifocal lens thereon. Fig. 11 is a similar view showing the lines marking the cement-scales of a bifocal lens. Fig. 12 is a view in perspective of an uncut cylinder-lens, showing the lens-outline thereon. Fig. 13 is a central sectional view of a leather disk having a concaved face, and Fig. 14 is a similar view of a leather disk having a convexed face.

Similar numerals refer to similar parts throughout the several views.

In carrying out my invention I employ an oblong machine-frame 1, which is in the nature of an elongated table having suitable supporting-legs 2. Journaled in an opening in the frame or table 1 is the upwardly-extending hub or hollow stem portion 3 of a bevel gear-wheel 4. Extending into the hollow of the hub 3 is the downwardly-extending central stem of a pattern-cam 5, the lower end of said stem being squared to propely engage the central squared opening of the gear-wheel 4 and the head of said pattern-cam being in the form of an ellipse or partial ellipse or of a form corresponding with a desired contour of lens. The cam-head 5 is provided, as indicated in Figs. 3, 8, and 9 of the drawings, with short upwardly-projecting fixed pins 6, said pins being adapted to detachably engage corresponding pin-sockets in the under side of a horizontally-arranged circular lens-table 7, said lens-table having its upper face provided with a circular depression, into which is fitted a disk of suitable leather or similar material 8.

Journaled and keyed to slide horizontally on the under side of the top plate of the table 1 is a shaft 9. This shaft carries thereon a bevel-pinion 10, the teeth of which mesh with those of the gear-wheel 4. On its outer end the shaft 9 carries a suitable hand-wheel 11. In forming the framework of my improved machine I preferably construct the same with a yoke-like vertical projection 12 near what we shall term the "rear" end of the table, and through the lower portions of the vertical arms of this yoke projection or bearing-frame passes longitudinally and loosely a shaft or rod 13, which has pivoted in its forward end a small friction wheel or roller 14, the periphery of which is adapted to bear upon the periphery or outer side of the cam-head 5. Between the vertical arms of the bearing projection 12 I provide a coiled spring 15, one end of which engages a projecting pin 16 on said rod 13, the tendency of said spring being to force said rod forward.

Through the upper portion of the bearing-frame 12 extends loosely and parallel with the shaft or rod 13 a rod 17. The outer or rear end of the rod 13 has connected therewith an upwardly-extending arm 18, through the upper end of which passes loosely said rod 17. The arm 18 and rod 17 are, however, adapted to be rigidly connected through the medium of a set-screw 19. One of the arms of the bearing-frame 12 is also adapted to be rigidly connected with the rod 17 through the medium of a set-screw 20. As shown in the drawings at 21, the rear portion of the rod 17 is provided with suitable graduations or scale-marks, while the forward portion of said rod is likewise provided with graduations representing inches and fractions of inches, as indicated at 22. The forward end of the rod 17 carries a vertical barrel or cylinder 23, through which passes a vertical plunger-rod 24, the latter being surrounded within the cylindrical arm 23 by a spring 25, the lower end of which bears in the bottom of said cylindrical arm and the upper end of which engages a pin on the plunger 24. The outer end of the plunger 24 is provided with a suitable head or finger-piece 26, and the lower end of said plunger is adapted to carry a glass-cutting diamond 27. The tension of the spring 25 is such as to normally maintain the diamond-carrying plunger 24 in a raised position.

Pivotally connected with the table-top, at one side of the center of the width thereof, is one end of the horizontal foot 28 of an angular arm 29, which rises from said foot in the manner indicated in the drawings. The unpivoted end portion of the foot 28 is provided with a side notch or recess 30, which is adapted to be made to engage the shank of a projecting pin or screw 31, thus latching the arm 29 in such position that its forwardly-extending and inwardly-curved portion terminates immediately over the center of the disk 8. This forward termination of the arm 29 is bifurcated, the fingers 29ª thereof forming bracket-arms arranged vertically one above the other, through which passes loosely a vertical centering-pin 32, the pointed lower end of which is normally held in contact with the disk 8 through the medium of a spring 33.

As indicated in the drawings, the periphery of the lens-table 7 is roughened or knurled, and, as indicated at 34, I provide the bearing-frame projection with an angular indicating-arm or pointer the outer termination of which is adjacent to the graduated surface of the rod 17. It will also be seen that upon the upper surface of the lens-table, adjacent to the outer edge thereof, I have provided degree-marks or graduations, such as are indicated at 7ª.

In order to illustrate the operation of my improved lens-cutting machine, I will assume that it is desired to cut a lens of a size and character previously prescribed by an oculist. In carrying out this operation the usual preliminary steps are first taken of obtaining the axis of the lens and marking the terminals of the same at opposite points on the uncut lens. The glass or uncut lens is then placed on the lens-table 7 and held in frictional engagement therewith through pressure of the center-pin or plunger 32, the latter bearing on the marginal axis-line of the lens. Now, following the formula or prescription of the oculist, the uncut lens is moved until its axis-marks register with the degree-marks 7ª of the lens-table called for in the prescription. The set-screws 19 and 20 being loosened, the rod 17 is now moved horizontally until the indicating-hand 34 points to that graduation 21 of the rod 17 which corresponds to the size of lens required by the prescription. The set-screw 19 is now tightened to secure a rigid connection of the rods 13 and 17. The cutting of the lens is now carried out by depressing with a finger of one hand the spring-actuated diamond-carrying plunger 24 until the diamond is in proper contact with the uncut lens and turning the hand-wheel 11 with the other hand, the result being the rotation of the lens-table 7 and the cutting on the lens of the desired ellipse. It will be obvious that in this operation the movement of the diamond-carrying rod 17 will be controlled by the movement of the lower rod 13 and that the backward-and-forward movement of the latter will be controlled by the outline of the pattern-cam with which the friction-wheel 14 is in contact.

In case the lens to be produced is what is known as a "cylinder-lens," such as is indicated in Fig. 12 of the drawings, it is obvious that the pressure of the finger upon the spring-actuated plunger 24 may be regulated so as to insure a uniform engagement of the diamond and glass with the convexed surface of the lens throughout the cut.

In order to cut a circular lens, the set-screw 19 is loosened, the rod 17 moved until the proper-sized graduation 22 is in line with the forward side of the bearing-frame 12, the diamond being thus brought opposite a point on the glass the distance between which and the center-pin 32 is equal to one-half the diameter of the circle desired. The set-screw 20 is now tightened, the diamond-holding plunger depressed, and the lens-table rotated, with the result that the rod 17 is held stationary and a perfect circle of the desired size is scratched upon the glass. In a somewhat similar manner it is obvious that my improved machine may be employed in cutting what are known as "bifocal" lenses, such as indicated at 35 in Fig. 10, or the cement-scales, (indicated at 36 in Fig. 11.) In producing the bifocal lens 35 the desired size of elliptical lens 37 is first scratched in the manner hereinbefore described, after which the center-pin carrying arm 29 is thrown outward away from the lens-table and the scratched line of the elliptical lens so placed as to intersect the center of the lens-table. It is evident that the operation of cutting the bifocal section from the lens 37 is accomplished by setting the rod 17 as in the process of cutting the circle, inasmuch as the cut necessary to produce the bifocal section is in the arc of a circle. In Figs. 6 and 8 of the drawings I have shown a pattern-cam the outline of which is more in the nature of an elongated ellipse, this pattern-cam being employed when it is desired to impart a substantially-elongated elliptical form to the lens to be cut. In cutting what is known as the "clerical" form of lens it is obvious that I may employ the semi-elliptical form of pattern-cam illustrated in Figs. 7 and 9.

As shown in Figs. 13 and 14 of the drawings, the leather disk 8 may have its upper bearing-surface concaved or formed convex to conform to the curvature of the uncut-lens glass and retain the surface of the latter in contact with the surface of said disk.

Where it is desired to cut a comparatively large lens, with the result that the glass plate from which the same is to be cut projects an unusual distance beyond the lens-table, it will be seen that the pinion-carrying shaft 9 may be moved outward until the hand-wheel 11 is in such position as to permit of its operation without the hand of the operator coming into contact with the glass. This movement of said shaft, as will be readily understood, is permitted by the fact that the shank or barrel of the pinion 10 is by contact with the end of the table 1 prevented from moving outward with the shaft and by the further fact that a sliding key connection is provided between the pinion 10 and said shaft.

From the construction and operation herein described it will be seen that not only are superior means provided for the rapid and accurate cutting of lenses of various sizes and forms, but that the means of adjustment of the parts are simple, and said parts are so constructed and arranged with reference to each other as to prevent any tendency toward their getting out of order. It will also be seen that the means described for retaining the glass-cutting diamond in cutting or scratching contact with the surface of the glass is such as to permit the pressure of said diamond being readily and easily regulated by the pressure of the finger on the plunger and a desirable uniform contact attained regardless of the plane of the lens-surface.

Having now fully described my invention, what I claim, and desire to secure by Letters Patent, is—

1. In a lens-cutting machine, the combination with a frame 1, a rotary lens-table mounted therein and a pattern-cam carried by said table, of a spring-actuated sliding rod 13 and graduated rod 17 and means for coupling the same and a vertical diamond-carrying spring-actuated plunger supported on the rod 17, substantially as specified.

2. In a lens-cutting machine, the combination with a frame 1, a rotary lens-table mounted therein and a pattern-cam carried by said table, of a spring-actuated sliding rod 13 and graduated rod 17 and means for detachably connecting the same, a vertical diamond-carrying spring-actuated plunger supported on the rod 17, an arm 29 having one end pivoted on said frame and a spring-actuated center-pin or plunger supported in its remaining end, substantially as specified.

3. In a lens-cutting machine, the combination with the frame 1, a rotary lens-table mounted therein and a disk of pliable material embedded in said lens-table and a pattern-cam carried by said table, of a spring-actuated sliding rod 13 having one end in contact with said pattern-cam and a graduated rod 17 and a detachable connection between the latter and the rod 13, a vertical diamond-carrying spring-actuated plunger on the rod 17 and a swinging center-pin-holding arm 29, substantially as specified.

LEWIS O. LINVILLE.

In presence of—
C. C. SHEPHERD,
A. L. PHELPS.